May 30, 1950 — J. S. PAGE — 2,509,363
JOINT FOR PIPE SECTIONS, OR THE LIKE
Filed Aug. 19, 1948
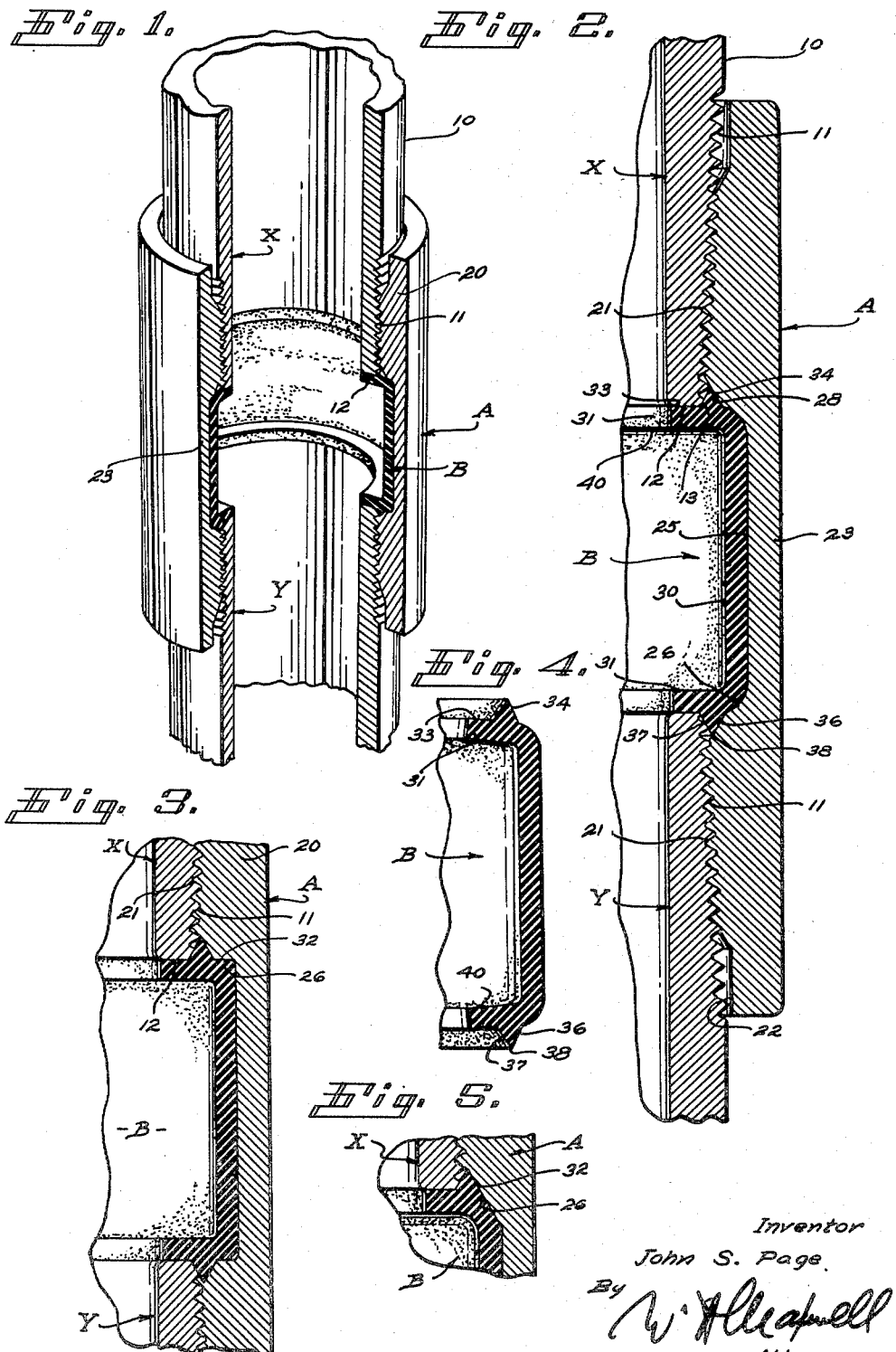
Inventor
John S. Page
By W. H. Cadwell
Attorney

Patented May 30, 1950

2,509,363

UNITED STATES PATENT OFFICE 2,509,363

JOINT FOR PIPE SECTIONS OR THE LIKE

John S. Page, Long Beach, Calif., assignor to Page Oil Tools Inc., Long Beach, Calif., a corporation of California Application August 19, 1948, Serial No. 45,147

5 Claims. (Cl. 285—157)

This invention is concerned with a joint for pipe sections, or the like, and it is a general object of the invention to provide a joint or joint construction that is easily operated, that serves to effectively and securely join elements such as sections of pipe, or the like, and which provides a fluid tight connection so that no leakage occurs, even though the connection serves to carry or hold fluids under high pressure.

Elements or members such as pipe sections are commonly joined by couplings, the couplings being threaded to the pipe sections. Such connections are easily made, are such as to stand the necessary forces or strains, and will hold low pressures, but they are not dependable or tight under high pressures. Further, in certain situations, as for instance in the oil fields, ordinary or standard V-threads have been replaced in such constructions by rounded threads which are strong and practical as threads but which do not serve to make fluid tight joints.

It is a general object of this invention to provide a joint for pipe sections, or the like, involving primarily a coupling and a seal, which seal is supported in the coupling and has sealing engagement with the inner ends or inner end portions of the pipe sections applied to the coupling.

Another object of this invention is to provide a joint of the general character referred to wherein the coupling has a recess or under-cut portion effectively carrying the seal, while the seal has projecting lips or flanges which engage the pipe sections and seal therewith without projecting into the pipe sections in a manner to in any way interfere with or to restrict flow therethrough.

Another object of this invention is to provide a joint construction of the general character referred to wherein V-shaped recesses are established by cooperation of the pipe sections with the coupling and the seal has sealing lips with projections which enter and seat in such recesses.

It is a further object of the present invention to provide a construction of the general character referred to which is exceedingly simple and inexpensive of manufacture. With the construction provided by the present invention the coupling is similar, generally, to an ordinary or standard coupling, except for the recess or under-cut provided therein and for beveled faces provided at the ends of the under-cut and adjacent the threaded portions that receive the pipe sections. The seal is a simple unitary annular body of rubber, or the like, with a tubular body portion carried in the undercut of the coupling and with simple projecting lips or flanges that engage the pipe sections to effectively seal therewith.

The various objects and features of my invention will be fully understood from the following detailed description of typical preferred forms and applications of the invention, throughout which description reference is made to the accompanying drawings, in which:

Fig. 1 is a perspective view of a structure embodying the present invention, a portion thereof being broken away to illustrate the construction and relationship of parts. Fig. 2 is an enlarged detailed sectional view of the construction provided by the present invention. Fig. 3 is a view similar to a portion of Fig. 2 showing a modified form of construction. Fig. 4 is a sectional view of a portion of the seal provided by the present invention showing it removed from the joint, and Fig. 5 is a detailed sectional view showing another form of construction embodying the present invention.

In the form of the invention shown in Figs. 1 and 2 of the structure provided by the present invention includes, generally, a coupling A receiving pipe sections X and Y, and a seal B carried by the coupling and having sealing engagement with the coupling and also with the pipe sections X and Y.

The pipe sections X and Y are shown as being of standard or typical construction in which the tubular body portion 10 of the pipe section is provided at its end portion with external threads 11 while the end 12 of the pipe section is flat and normal to the axis of the pipe section except at the outer corner where it is inclined or beveled as shown at 13.

The coupling A is shown as a simple, elongate tubular element with end portions 20 provided internally with threads 21 cooperating with or receiving the threads of the pipe sections. The entrances to the threaded end portions are preferably enlarged somewhat, as shown at 22, and are free of threads so that they serve to effectively guide the pipe sections into the coupling as the structure is assembled. The threaded end portions 20 of the coupling are separated a substantial distance apart by a middle portion 23 of the coupling. In accordance with standard joint construction the threads of the pipe sections and the end portions of the coupling cooperate so that when the pipe sections are fully engaged with the coupling the inner ends 12 of the pipe sections occur where the threaded end portions 20 of the coupling join the middle portion 23.

In accordance with the present invention the middle portion 23 of the coupling is recessed or undercut at 25 between the end portion 20, and the ends 26 of the recess or undercut 25 are so located as to be at or near the ends 12 of the pipe sections when the pipe sections are fully assembled with the coupling. In the form of the invention shown in Figs. 1 and 2 the corners formed where the ends 26 occur are rounded, whereas in the form of the invention shown in Fig. 3 these corners are square or without fillets or rounded portions. In the form shown in Fig. 5 the beveled faces hereinafter referred to extend to the bottom of the counterbore so there are no sharp corners.

In accordance with the present invention the corners that occur between the ends 26 or end portions of the counterbores 25 and the threaded portions of the coupling are beveled or inclined, as shown at 28. The beveled portions or faces 13 of the pipe sections cooperate with the beveled portions or faces 28 in the coupling to form V-shaped recesses one at the inner end of each pipe section, and the two V-shaped recesses are opposed, as is clearly illustrated in the drawings.

The seal B provided by the present invention includes a tubular body portion 30 which seats in the counterbore 25 of the coupling and extends between the ends 26 of the counterbore. At the ends of the seal the body 30 is provided with inward radially projecting flanges 31 each with an outer face having a portion 32 seating against an end 26 of the counterbore and a portion 33 seating against the end 12 of a pipe section. Between the portions 32 and 33 each flange or lip 31 of the seal has a projecting rib 34 which enters and seats in the V-shaped groove formed by co-operating faces 13 and 28. In the preferred form of the invention each rib 34 has flat inclined faces 36 and 37, respectively, which converge and join at a point or ridge 38. The faces 36 seat against the faces 28 in the coupling while the faces 37 seat against the faces 13 of the pipe sections while the tips or ridges 38 of the lips 34 engage in the bottoms of the V-shaped recesses formed by the cooperating faces 13 and 28.

The inner sides 40 of the lips 31 are free and unobstructed and occur opposite the ribs 34 and the portions 33 of the lips 31 so that pressure carried by the construction acts on the lips to spread them and consequently hold the ribs 34 tight in the recesses while the portions 33 seat tight against the ends 12 of the pipe sections.

In the preferred form of the invention the seal B as hereinabove described is preferably molded or otherwise formed of rubber, or rubber-like material, and is so formed that the flanges or lips 31 diverge somewhat apart as they project inwardly when they are in their normal position and before being incorporated in a joint, as shown in Fig. 4 of the drawings. Through this formation of the lips proper pressure engagement is assured with the ends 12 of the pipe sections, and the lips 31 are somewhat deformed or flexed inwardly or toward each other when the connection is fully assembled, as shown in the drawings. It is to be understood that when the structure is to be employed for handling hydrocarbons or materials that affect rubber, rubber substitutes, which are not affected by such materials, are employed in the formation of the seal. Further, it is to be understood that the seal may be varied as to weight or size and as to stiffness, as circumstances may require.

When the structure provided by my invention is subjected to pressure the lips or flanges seat against the ends of the pipe sections and the ribs on the lips are pressed tight into the V-shaped recesses defined by the pipe and coupling. The ribs fill the recesses and seal with the inclined faces and they prevent the lips from being deformed or distorted in such recesses as to be cut or injured by parts or edges of the pipe sections or coupling.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In combination, a tubular coupling having internally threaded end portions, pipe sections threaded into said portions of the coupling, the coupling and pipe sections having faces adjoining where the sections adjoin and forming opposed V-shaped recesses, and a seal carried by the coupling and having projecting lips engaging the ends of the pipe sections and having V-shaped ribs seated in the recesses.

2. In combination, a tubular coupling having internally threaded end portions and a counterbored portion between the threaded portions substantially larger in diameter than the end portions, pipe sections threaded into said threaded portions of the coupling with their inner ends at the ends of the counterbore, the coupling and pipe sections having faces adjoining where the sections engage each other and forming opposed recesses, and a seal seated in the counterbored portion of the coupling and having inwardly projecting radial lips at its ends engaging the ends of the pipe sections and having axially projecting ribs on the outer sides of the lips seated in the recesses.

3. A coupling for pipe sections with externally threaded end portions and beveled between the threaded portions and ends including, a tubular body with internally threaded end portions and a counterbored portion between the end portions and beveled between its ends and the internally threaded portions, and a seal carried in the counterbored portion of the body and having projecting lips at its ends with ribs sealing against the said beveled portions, the lips being divergent and having pressure engagement with the ends of the pipe sections when the pipe sections are engaged in the coupling.

4. In combination, a tubular coupling having internally threaded end portions, pipe sections threaded into said portions of the coupling, the coupling and pipe sections having faces adjoining where the sections adjoin one another and forming opposed recesses, and a seal of rubber-like material carried by the coupling and having projecting lips engaging the ends of the pipe sections and having ribs seated in the recesses, the lips being normally divergent and having pressure engagement with the ends of the pipe sections when the pipe sections are fully engaged in the coupling.

5. In combination, a tubular coupling having internally threaded end portions and an internal counterbore between the end portions with ends beveled from the bottom of the counterbore to where they join the threaded portions forming inclined seats, pipe sections threaded into the end portions and having beveled portions forming inclined faces cooperating with the seats forming opposed recesses, and a seal carried in the counterbore and having projecting lips with ribs seated in the recesses.

JOHN S. PAGE.

REFERENCES CITED

The following references are of record in the file of this patent:

UNITED STATES PATENTS

| Number | Name | Date |
|---|---|---|
| 906,225 | Harrison | Dec. 8, 1908 |
| 2,040,766 | Chappell | May 12, 1936 |
| 2,340,537 | Keener | Feb. 1, 1944 |